United States Patent [19]

Lutz et al.

[11] Patent Number: 4,964,505
[45] Date of Patent: Oct. 23, 1990

[54] LOCKING SYNCHRONIZING MEANS FOR TRANSMISSON SHIFTS

[75] Inventors: Rolf Lutz, Tettnang; Franz Reinalter, Friedrichshafen; Heinz Fiechtner, Mardorf, all of Fed. Rep. of Germany

[73] Assignee: Zahnradfabrik Friedrichshafen AG, Friedshafen, Fed. Rep. of Germany

[21] Appl. No.: 272,773
[22] PCT Filed: Mar. 11, 1987
[86] PCT No.: PCT/EP87/00142
§ 371 Date: Aug. 26, 1988
§ 102(e) Date: Aug. 26, 1988
[87] PCT Pub. No.: WO87/05675
PCT Pub. Date: Sep. 24, 1987
[51] Int. Cl.$^5$ ............... F16D 21/04; F16D 23/06; F16D 9/00
[52] U.S. Cl. .................... 192/53 F; 192/82 T
[58] Field of Search .............. 192/53 F, 53 E, 53 G

[56] References Cited

U.S. PATENT DOCUMENTS

| | | | |
|---|---|---|---|
| 2,930,462 | 3/1960 | Willis | 192/53 F |
| 3,247,937 | 4/1966 | Ivanchich | 192/53 F |
| 3,270,843 | 9/1966 | Ivanchich | 192/53 F |
| 3,861,509 | 1/1975 | Inoue et al. | 192/53 F |
| 4,108,424 | 8/1978 | Rizzo | 192/82 T X |
| 4,300,668 | 11/1981 | Nozawa et al. | 192/53 F |
| 4,378,710 | 4/1983 | Knodel | 192/53 F X |
| 4,413,715 | 11/1983 | Michael et al. | 192/53 F |
| 4,811,825 | 3/1989 | Christian et al. | 192/53 F |
| 4,817,773 | 4/1989 | Knedel et al. | 192/53 F |

FOREIGN PATENT DOCUMENTS

| | | |
|---|---|---|
| 648984 | 1/1951 | United Kingdom . |
| 783771 | 10/1957 | United Kingdom . |
| 803979 | 11/1958 | United Kingdom ............. 192/53 F |
| 1032542 | 6/1966 | United Kingdom . |
| 11954939 | 6/1970 | United Kingdom . |

Primary Examiner—Rodney H. Bonck
Attorney, Agent, or Firm—Herbert Dubno

[57] ABSTRACT

A locking synchronizer for transmission shifts, has a sliding sleeve carrier and a gear revolving at a different speeds of rotation coupled together upon attaining synchronism by means of an axially slidable, annular sliding sleeve. A coupling tooth array of the sliding sleeve (11) engages a corresponding spur gearing (11) of the sliding sleeve carrier (21) as well as a coupling tooth array (21) of the gear, with engagement pins positioned between the sliding sleeve carrier and sliding sleeve 3. Portions of the gear form with portions of the synchronizing ring a coupling capable of transmitting force and with locking teeth on the synchronizing ring for the temporary prevention of the axial movement of the sliding sleeve, whereby the preventive action is cancelled even during existing defference in speed of rotation as a function of the warming on the synchronizing ring or a defined unlocking force which acts transversely to the motion of the sliding sleeve on the locking teeth of the synchronizing ring.

1 Claim, 1 Drawing Sheet

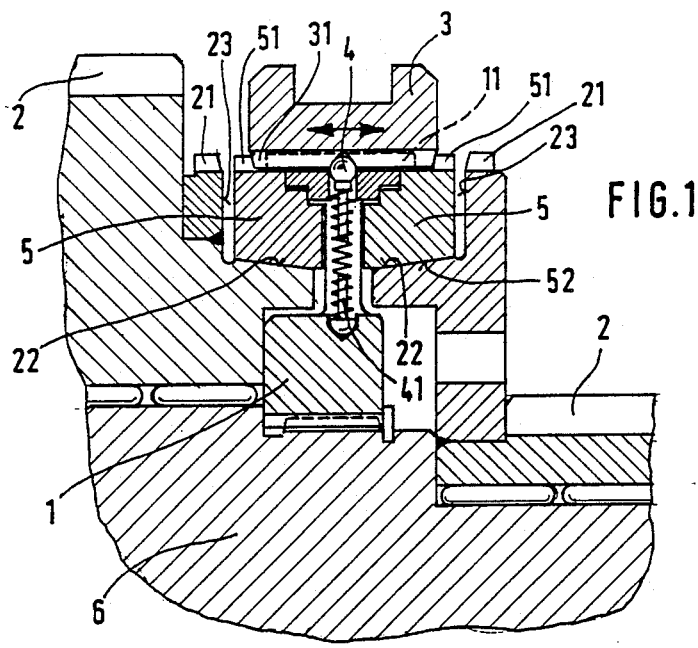
FIG.1
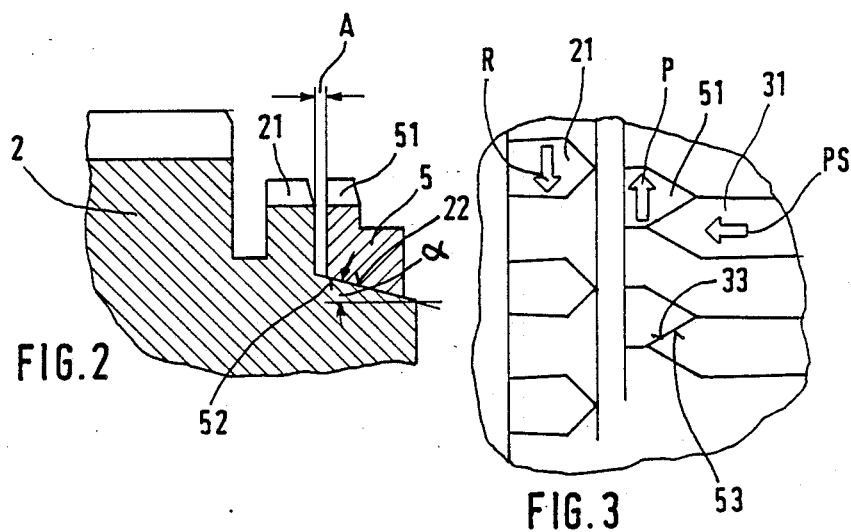
FIG.2
FIG.3

LOCKING SYNCHRONIZING MEANS FOR TRANSMISSON SHIFTS

SPECIFICATION

CROSS REFERENCE TO RELATED APPLICATION

This application is a national phase of PCT/EP87/00142 which is based upon Luxembourg PCT/EP86/00166.

FIELD OF THE INVENTION

This invention relates to a locking synchronizing means for transmission shafts.

BACKGROUND OF THE INVENTION

Synchronizing means are known from Looman-Zahnradgetriebe (Konstruktionsbucherband 26) Springer-Verlag Berling/Heidelberg/New York 1970, page 259FIG. 10.9, where the clutching tooth array of the sliding sleeve is locked onto the locking tooth array of the synchronizing ring as long as synchronism is not achieved between the synchronizing body and the gear. Such arrangements are very advantageous for the driver, because they require relatively little attention to shifting. However, they have the disadvantage that the friction means are overloaded due to the appearance of large differences in speed fo rotation and the high shifting forces frequently applied, and therefore wear out rapidly and fail prematurely. Particularly when shifting into reverse while the vehicle still moves ahead, relatively high differential speeds of rotation have to be synchronized, so that the synchronizing means are especially endangered for such a shift. However, the engine is also in jeopardy since in a locking synchronizing arrangement, the engagement of the reverse gear cannot be excluded with certainty during excessively fast forward motion. Upon clutching-in, the engine can be damaged because of reversal of rotation.

OBJECT OF THE INVENTION

It is the object of the invention to fashion a synchronizing mean such that overloading and thereby a destruction of the synchronizing means and damage to the engine is prevented.

This object is attained with locking synchronizing means for transmission shifting, in which a carrier for a sliding sleeve and a gear rotating at a different speed of rotation are coupled together rigidly at synchronism by means of an axially slidable annular sliding sleeve. A coupling tooth array of the sliding sleeve engages a corresponding spur gearing of the sliding. sleeve carrier and the coupling tooth array of the gear as well. Engagement pins are positioned between the sliding sleeve carrier and sliding sleeved and in uncoupled condition, engage in a recess of the interior of the sliding sleeve and have pressure surfaces which are in effective connection with pressure surfaces on a synchronizing ring. The latter which is positioned axially between the sliding sleeve carrier and the gear, and is capable of being entrained by the sliding sleeve carrier circumferentially, with play, in both directions, via dogs. Portions of the gear together with portions of the sychronizing ring form a power-transmitting coupling system having friction surfaces and with locking teeth on the synchronizing ring for the temporary lockout of the axial motion of the sliding sleeve.

according to the invention, the locking action of the locking teeth is limited even during prevailing difference in speed of rotation and is cancelled as a function of the warming of the synchronizing ring or by an increase of the unlocking force and/or a reduction of the friction moment. Grinding noises are generated upon axial motion of the sliding sleeve in the direction toward the coupling tooth array during a preaviling excessive difference in speed of rotation. These grinding noises cause the driver to complete the shifting operation only after applying means of synchronizing speed of rotation.

An overloading of the synchronizing means is prevented with certainty by doing away with the locking action in the face a prevailing differential speed of rotation between the elements to be connected, namely the sleeve and gear. If this achieved by warming of the synchronizing ring, then the latter expands detaches itself from the friction cone of the gear because it bears axially against the gear. The friction moment on the cone collapses, and due to the effect of the unlocking force from the axial force of the sliding sleeve on the locking tooth of the sychronizing ring the latter is turned backwards. and the sliding sleeve can be moved in axial direction further upon the array of coupling teeth of the gear. A like effect is also obtained by attuning the friction moment to the maximum unlocking force attainable. A sufficiently large unlocking force can overcome the friction moment even without the latter being nullified, and can turn the synchronizing ring backward in peripheral direction, so that the locking teeth of the synchronizing ring cannot prevent the axial movement of the sliding sleeve any lower. With such an arrangement, normal or permissible shifts are handled even in reverse gear, without a destruction of synchronization due to overload being possible. If however the forward motion and thus the differential speed of rotation between sliding sleeve and gear is still too fast, then a grinding or rattling noise will be caused by the attempted engagement of the spur gear teeth of the sliding sleeve with the coupling tooth array of the gear, so that the driver will not complete at all or well delay shifting. This prevents damage to the engine due to reversal of rotation.

The synchronizin ring can be so dimensioned that when the difference of speed of rotation between the gear and the sliding sleeve carrier and the sliding is too high, it is heated up due to an excessively long duration of friction, it expands and bears against the face of the coupling tooth array, and thus the friction on the friction surfaces is cancelled. Alternatively, the locking surfaces and the locking teeth of the synchronizing ring and on the sliding sleeve are so dimensioned angularly, that the possible unlocking force (p) which results from the axial shifting force (PS) of the shifting sleeve, is greater than the friction moment (R) resulting from the friction pair of the friction surfaces. The friction surfaces between synchronizing ring and gear can have a profile which reduces the friction surface or a conformation lowering the friction value. The cone angle $\alpha$ of the friction surfaces can be made especially great, e.g. above 10°.

The signal to the driver can be made very perceptible by an appropriate fashioning of the faces of the coupling tooth array, e.g. by proper rounding, so that damage to the engine can be prevented with even greater assurance. If the axial distance between the synchronizing ring and its bearing against the face of the coupling tooth array is held small, and is so adjusted that the generated when synchronization is attempted while vehicle speed is too high, will cause expansion of the synchronizing ring, and its bearing against the face, then due to the collapse of the friction moment the locking action between the sliding sleeve and the locking tooth on the synchronizing ring is nullified, and the sliding sleeve can be move in an axial direction onto the coupling tooth array of the gear. If a difference in rotational speed remains, then a grinding noise will be caused, and the shift, e.g. into reverse, can be further delayed, until the difference in rotation permits a faultless shift.

The adjustment of the unlocking force and of the friction moment can be attained by appropriate shaping of the angles for the locking surfaces on the sliding sleeve and the synchronizing ring for reduction of the unlocking force or by appropriate shaping or the angles of the friction cones or their friction surface for reduction of the friction moment.

BRIEF DESCRIPTION OF THE DRAWING

The above and other objects, features and advantages of my invention will become more readily apparent from the following description, reference being made to the accompanying highly diagrammatic drawing in which FIG. 1 is a cross sectional view of a double shift coupling with synchronizing FIG. 2 is a partial section of FIG. 1 through a gear and a synchronizing ring; and FIG. 3 is a schematic representation of the locking surface on the coupling tooth array of the sliding sleeve and the gear as well as the locking tooth array of the synchronizing ring.

Specific Description

FIG. 1 is shows a double shift coupling with locking synchronizing means. For simplicity, however, only one locking synchronizing means is described in one shift coupling. On a drive shaft 6 is fastened a carrier 1 for a sliding sleeve 3. The carrier is fixed against rotation and axial movement relative to shaft 6, and is connected to the sliding sleeve 3, via gear tooth array 11, 31. The sliding sleeve 3 is thus fixed against rotation relative to the carrier 1 and shaft 6.

Additionally, a synchronizing ring 5 is provided. The ring 5 has a conical friction surface 52 located between the carrier 1 for the sliding sleeve 3 and the gear 2. This friction surface 52 cooperates with the friction surface 22 of gear 2. Additionally, several engagement pins or pressure bolts 4 are distributed along the circumference of sliding sleeve carrier 1 and which are urged radially outwardly by compression springs 41 into conical recesses of sliding sleeve 3. The radially outward portion is shaped as a spherical surface, or is fashioned as a ball in known manner. The synchronizing ring 5 is connected to the carrier 1 for sliding sleeve 3 in known manner via an arrangement of dogs, whereby a ralative motion in circumferential direction as well as an axial motion is possible. The friction surface 22 coordinated to gear 2 is formed directly on gear 2 or on a coupling body fastened on the gear. The gear proper or the coupling body carries additionally a coupling tooth array 21, which is rounded or chamfered off in axial direction, that is toward thd sliding sleeve. In the partial view of FIG. 2, synchronizing ring 5 is shown in addition to gear 2. The friction surfaces 22 of the gear and 52 of the synchronizing ring form the conical frictin means with the cone angle α. The axial distance between gear 2 and the synchronizing ring is designated with A.

FIG. 3 show in schematic representation a tooth 31 of the sliding sleeve 3 with the locking surface 33 and a locking tooth 51 of the synchoronizing ring 5 with the locking surface 53. The unlocking force acting on locking tooth 51 is designated P, which results from the shifting force PS which acts on the sliding sleeve and the angle of the locking surface 33, 53. The friction moment R counteracts the unlocking force in circumferential direction.

The operation is as follows: The sliding sleeve 3 entrains engagement pings 4 when moved in the directions of the arrows shown, e.g. to the left, and the engagement pins press upon the respective (i.e. left-hand) synchronizing ring so as to initiate synchronization (i.e. angular movement of the ring with the shaft).

The synchronizing ring moves slightly axially in the same direction as the sliding sleeve. The friction arrangement 52, 22 between gear and synchronizing ring becomes active, and the synchronizing ring is moved in circumferential direction by a limited amount so that a further axial movement of the sliding sleeve this is prevented from further axial movement via the locking teeth 51 on the synchronizing ring and the locking surfaces 53 and 33, in accordance with FIG. 3 (for the left hand ring) teeth 51 of the synchronizing ring 5 are, in this case held in this locking position by the frictin moment. While a normal locking synchronization is held in this position for the length of time until synchronization is attained between gear 2 and sliding sleeve carrier 1 or the sliding sleeve 3, respectively, the friction moment is negated when difference of speed of rotation still previals, or the unlocking force, while shifting force PS is fully effective, is greater than the friction moment, so that the synchronizing ring 5 is turned backwards via the locking surfaces 33, 53, and the sliding sleeve can be moved further in axial direction.

The reduction or even cancellation of the friction moment can be attainec by a suitable dimensioning of the synchronizing ring, so that it heats up and expands when the differnce in rotational speed is too large. If in this case the gap between gear 2 and synchronizing ring 5, according to FIG. 2, is relatively small, then the synchronizing ring will come to abut against the gear on its face and breaks away with friction surface 52 from the friction surface 22 of the gear. The friction moment R collapses, and the sliding sleeve 3 can be slid further in direction toward gear 2. If the difference in rotational speed is still too high, then there will be grinding (noise) upon engagement of the tooth tops of the sliding sleeve 3 with coupling tooth array 21 of gear 2, so that the operator can discontinue the operation, without allowing the driver being in to destroy synchronization. The ratio between unlocking force to friction moment can thereby be influenced by the angle on the locking surfaces 33, 53 of the locking surfaces 33, 53 of the coupling tooth array 31 and the locking tooth array 51, because the unlocking force is increased by a steeper angle. A further effect is possible by reduction of the friction moment. This can be accomplished by reduction of the physical size of the friction surface; by a suitable choice of its profile. The friction moment can also be reduced by an appropriate cone angle of about 10° or more, since the cone angle in a conventional synchronization device is about 6°.

We claim:

1. A locking synchronization device for transmission shifting, comprising:
   a shaft;
   a gear rotatable relative to said shaft and having a first array of coupling teeth;
   a carrier rotatable with and axially fixed to said shaft;
   a sliding sleeve axially shiftable relative to said carrier and rotationally coupled therewith, said sliding sleeve having a second array of coupling teeth axially interengageable with the coupling teeth of said first array upon synchronization of rotation of said gear and said sliding sleeved and axial displacement of said sliding sleeve into engagement with said first array of coupling teeth on said gear sliding sleeve being axially shiftable in a transmission-shifting path including a forward and a reverse speed of a transmission;
   a synchronizing ring rotatable relative to said sliding sleeve and having an array of locking teeth engageable with the coupling teeth of said second array on said sliding sleeve upon frictional retardation of angular displacement of said synchronizing ring with said sliding sleeve to limit axial displacement of said sliding sleeve toward said gear and lock out coupling of said sliding sleeved with said first array of coupling teeth on said gear until synchronization of said sliding sleeve and said gear has occurred and upon consequent release of said coupling teeth of said second array by said locking teeth;
   at least one engagement pin interposed between said carrier and said sliding sleeve to angularly interconnect said sliding sleeve and said sychronizing ring, said synchronizing ring and said gear having mutually engaging frictrional surfaces frictionally coupling said gear with said synchronizing ring for power transmission therebetween whereby the rotational speeds of said sliding sleeve and said gear are synchronized to permited said coupling teeth of said first and second arrays to interengage;
   means for automatically relieving locking engagement of said locking teeth against the coupling teeth of said secondary array on said sliding sleeve upon a large speed differential between said shaft and said gear tending to overload said frictional surfaces, thereby permitting axial shifting of said sliding sleeve toward said gear; and
   means including juxtaposed ends of the coupling teeth of saif first and second arrays for generating a driver-alerting grinding noise upon engagement of the coupling teeth of said sliding sleeve and said gear at said differential to enable a driver to interrupt shifting, said means for relieving locking engagement of said locking teeth against the coupling teeth of said second array including an abutment surface of said gear, said synchronizing ring being dimensioned to enlarge upon heating at said large speed differential between said shaft and said gear tending to overload said frictional surface and to abut said surface and relieve contact between said frictional surfaces.

* * * * *